United States Patent
Wunderlich et al.

(10) Patent No.: US 8,879,171 B2
(45) Date of Patent: Nov. 4, 2014

(54) COLOR-CORRECTED F-THETA OBJECTIVE FOR LASER MATERIAL PROCESSING

(71) Applicant: JENOPTIK Optical Systems GmbH, Jena (DE)

(72) Inventors: Joerg Wunderlich, Brahmenau (DE); Ullrich Krueger, Milda (DE)

(73) Assignee: JENOPTIK Optical Systems GmbH, Jena (DE)

(*) Notice: Subject to any disclaimer, the term of this patent is extended or adjusted under 35 U.S.C. 154(b) by 114 days.

(21) Appl. No.: 13/848,233

(22) Filed: Mar. 21, 2013

(65) Prior Publication Data
US 2013/0279027 A1    Oct. 24, 2013

(30) Foreign Application Priority Data
Mar. 21, 2012 (DE) .................. 10 2012 006 244

(51) Int. Cl.
  *G02B 9/62* (2006.01)
  *G02B 9/00* (2006.01)
  *G02B 13/00* (2006.01)
  *G02B 27/00* (2006.01)

(52) U.S. Cl.
  CPC ........ *G02B 13/0005* (2013.01); *G02B 27/0031* (2013.01)

USPC .......................................... 359/761; 359/662

(58) Field of Classification Search
USPC .................... 359/756, 761–762, 662
See application file for complete search history.

(56) References Cited

U.S. PATENT DOCUMENTS

| | | | |
|---|---|---|---|
| 7,312,847 B2 * | 12/2007 | Rostalski et al. | 355/53 |
| 7,924,510 B2 | 4/2011 | Kobayashi | |
| 8,670,193 B2 * | 3/2014 | Koga | 359/793 |
| 2010/0085651 A1 | 4/2010 | Asami | |
| 2011/0288824 A1 * | 11/2011 | Bietry et al. | 703/1 |
| 2013/0050839 A1 * | 2/2013 | Oskotsky et al. | 359/662 |

FOREIGN PATENT DOCUMENTS

EP    1 477 258 A1    11/2004

* cited by examiner

*Primary Examiner* — Jordan Schwartz
(74) *Attorney, Agent, or Firm* — Muncy, Geissler, Olds & Lowe PLLC

(57) ABSTRACT

An F-theta objective which is color-corrected for a wavelength range of 1065-1075 nm and is suitable for high laser outputs of more than 1 kW, having sixth individual lenses L1-L6, wherein the lenses are formed of at least two different materials.

3 Claims, 1 Drawing Sheet

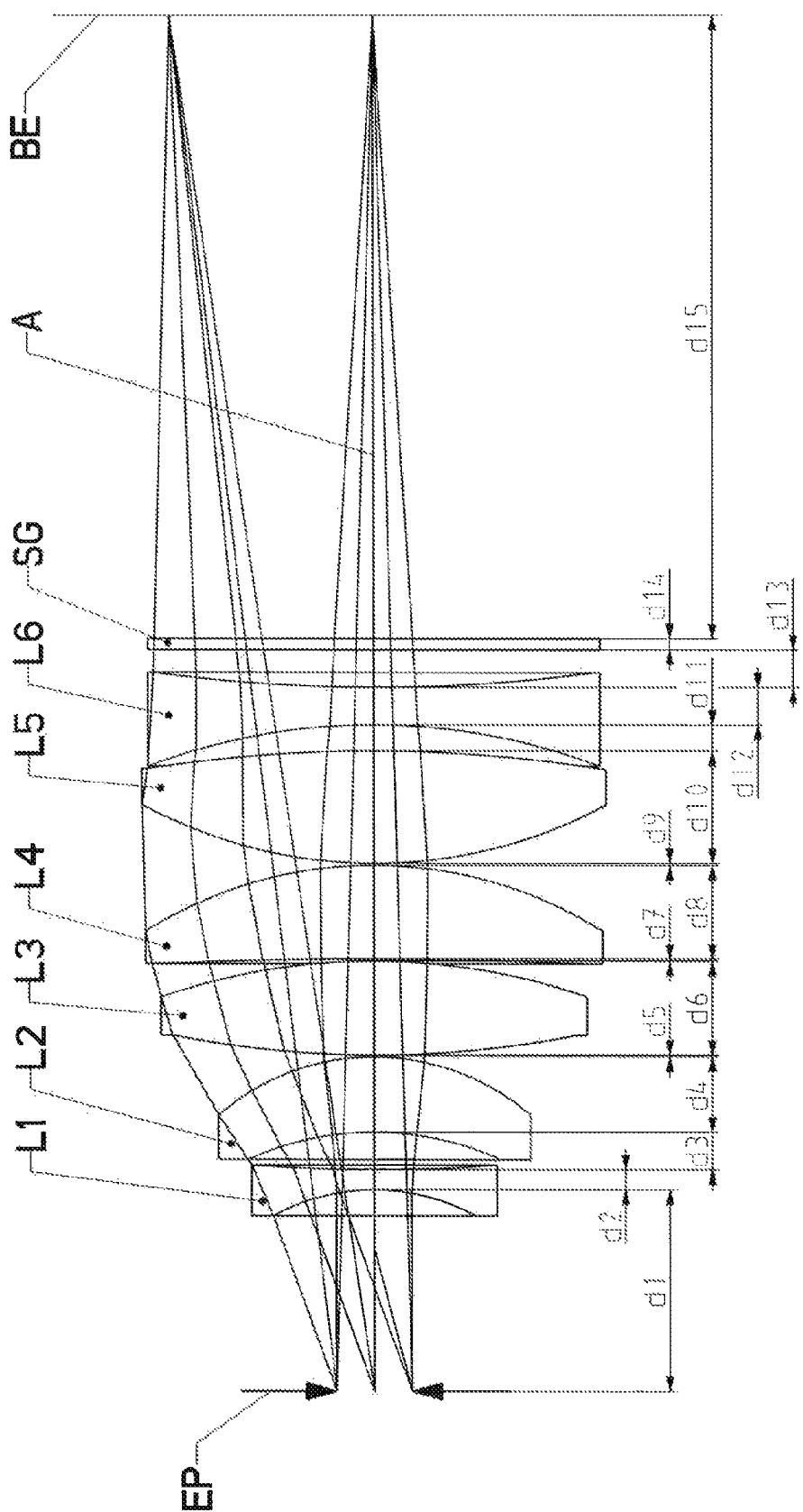

COLOR-CORRECTED F-THETA OBJECTIVE FOR LASER MATERIAL PROCESSING

This nonprovisional application claims priority under 35 U.S.C. §119(a) to German Patent Application No. DE 10 2012 006 244.3, which was filed in Germany on Mar. 21, 2012, and which is herein incorporated by reference.

BACKGROUND OF THE INVENTION

1. Field of the Invention

The invention relates to an F-theta objective, which is chromatically corrected for broadband laser radiation, for focusing a scanning high-power laser beam into a flat image field and has, arranged along the optical axis, lenses of different materials which are resistant at a laser output of more than 1 kW.

2. Description of the Background Art

In laser material processing, increasingly lasers having high outputs are used for welding or separating parts. One disadvantage of these lasers is their relatively great chromatic bandwidth and absorption of the laser radiation by the lenses of the F-theta objective and thus the heating thereof.

The chromatic bandwidth and heating influence the focusability of the laser radiation.

An F-theta objective commonly used for laser material processing is adapted for monochromatic radiation. The position of the focal plane and the geometry of the scan field are thus determined by exactly one wavelength. If chromatically broadband laser radiation is used, a separate focal plane for each wavelength and a scan geometry which differs according to each wavelength are obtained. The effect for laser material processing is a laser focus which is significantly greater, both in the spatial depth (longitudinally) and also orthogonally with respect thereto (laterally), than with use of monochromatic radiation. Thus, the processing surface area, which is subjected to laser radiation, on the material to be processed is larger, the power density correspondingly lower and the power necessary to achieve the desired processing effects higher.

Another effect when using F-theta objectives with high-power laser radiation is the heat that is introduced into the optical system. As a result, the position of the focal plane changes with the change in temperature of the F-theta objective. The distance between the F-theta objective and the processing plane, however, is generally kept constant, and therefore the focal point moves longitudinally with respect to the processing plane and the laser radiation is no longer focused in the processing plane, but instead a defocused beam spot is imaged here. A temperature-controlled tracking of the processing plane would be extremely complex. In terms of material processing, this means that the beam spot imaged on the processing plane is greater and thus the power density lower. In the worst case, no more material processing is performed because the power density has dropped below the processing threshold.

It is thus necessary to correct both the position of the focal plane and the scan geometry for the chromatic bandwidth. In addition, if possible no heat, or only a small amount of heat, should be introduced into the objective, or a change in temperature of the objective should have no influence or only little influence on the position of the focal plane.

Color-corrected F-theta objectives for laser applications are known from the conventional art for separate wavelengths, for example for 808 nm and 940 nm. These objectives are corrected for two or more wavelengths, but only for separate monochromatic emission lines.

In addition, color-corrected F-theta objectives which are designed for a particular monochromatic emission line of a processing laser and, for this purpose, have a corrected wavelength range for observing the working area are known.

An objective of this type is known from patent application EP 1 477 258 A1. The F-theta objective disclosed herein is a component part of an apparatus for local thermal treatment, with which point-accurate thermal treatment together with integrated monitoring of the working area is intended to be made possible. For sharp imaging of the working area, the objective must be corrected, in addition to for the wavelength of the processing laser, also for the wavelength range of the illumination radiation.

The F-theta objective disclosed herein comprises three elements, two of which elements have a collecting effect and one element has a dispersing effect, wherein one of the collecting elements is a lens component for achieving the necessary imaging quality. By suitably combining the glass types of the elements, in respect of which no further information is provided, the color correction for the corresponding wavelength ranges is intended to be achieved.

As a processing laser, examples mentioned are, as a solid-state laser, a Nd-YAG laser, fiber laser, disc laser or semiconductor laser. Such lasers have one or more monochromatic emission lines for which the F-theta objective is corrected.

SUMMARY OF THE INVENTION

It is therefore an object of the present invention to provide an F-theta objective which is color-corrected for a chromatically broadband high-power laser radiation in the range of 1065-1075 nm and is thermally stable with respect to a laser output of more than 1 kW.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein the FIGURE shows a geometric optics diagram of an object according to an embodiment of the invention.

DETAILED DESCRIPTION

An F-theta objective according to an embodiment of the invention has, arranged at a distance upstream of the F-theta objective, an entrance pupil EP which can be arranged in a plane in which a scanner mirror, or if two scanner mirrors are used a substitute plane that is calculated herefor, lies and comprises six individual lenses L1-L6 which are arranged on a common optical axis A.

A laser beam is coupled into the F-theta objective from the direction of the entrance pupil EP, as a result of which the beam passage direction is defined.

The first lens L1 is a biconcave lens, the second lens L2 is a meniscus, the third lens L3 is a biconvex lens, the fourth lens L4 is a plano-convex lens, the fifth lens L5 is a biconvex lens and the sixth lens L6 is a biconcave lens.

The six lenses L1-L6 are made of at least two different materials, the at least two materials being selected such that they have as low an absorption as possible for the range 1065-1070 and have different refractive indices which change, dependent on the temperature, in opposite directions. That is to say that, while the refractive index of one material for a constant wavelength increases with increasing temperature, the refractive index of the other material for the same wavelength decreases with increasing temperature. As a result, temperature-dependent changes of the material properties of the individual lenses L1-L6 can be compensated for.

A protective glass SG can be arranged downstream of the six individual lenses L1-L6.

The useful effect achieved using an F-theta objective according to an embodiment of the invention is that it is chromatically corrected for a chromatically broadband high-power laser radiation, in the range of 1065-1075 nm, and is thermally stable for a laser output of more than 1 kW.

The specific structure and the parameters of an exemplary embodiment for an F-theta objective of this type are described below.

The entrance pupil EP of the F-theta objective is located, at a distance d1, in front of the front vertex point of the first lens L1, a biconcave lens having a thickness d2, the front surface of which has a radius r1 and the back surface of which has a radius r2. This first lens L1 is followed, with an air gap d3, by the second lens L2, a meniscus having a thickness d4, the front surface of which has a radius r3 and the back surface of which has a radius r4. This is followed, with an air gap d5, by the third lens L3, a biconvex lens having a thickness d6, the front surface of which has a radius r5 and the back surface of which has a radius r6. This is followed, with an air gap d7, by the fourth lens L4, a plano-convex lens having a thickness d8, the front surface of which has a radius r7 and the back surface of which has a radius r8. This is followed, with an air gap d9, by the fifth lens L5, a biconvex lens having a thickness d10, the front surface of which has a radius r9 and the back surface of which has a radius r10. This is followed, with an air gap d11, by the sixth lens L6, having a thickness d12, the front surface of which has a radius r11 and the back surface of which has a radius r12. This is followed, at a distance of d13, a plane-parallel protective glass SG having a thickness of d14. The image field BE occurs at a distance of d15 from the protective glass SG.

Quartz glass was selected as the material for the first and sixth individual lenses L1, L6. Quartz glass has a refractive index that changes from 1.449559 to 1.449499 over the wavelength range of 1065-1075 nm.

Calcium fluoride was selected as the material for the second to fifth individual lenses L2-L5. Calcium fluoride has a refractive index that changes from 1.428442 to 1.428412 over the wavelength range of 1065 1075 nm.

Both quartz glass and calcium fluoride have only a low absorption for the wavelength range mentioned, and as a result the individual lenses L1-L6 heat up only slightly.

It is also an advantage of these materials that the refractive indices change in opposite directions as the temperature changes. Thus, the temperature coefficient of the refractive index for quartz at a wavelength of 1060 nm is 8.9 in a temperature range of about −30° C. and 9.4 in a temperature range of about +30° C. The temperature coefficient of the refractive index of calcium fluoride, on the other hand, at a wavelength of 1060 nm is 8.4 in a temperature range of about 30° C. and 10.4 in a temperature range of about +30° C.

Through the combination of the two materials in conjunction with the geometric parameters of the arrangement of the individual lenses L1-L6 it is possible to influence the temperature-related changes of the properties of the F-theta objective and thus stabilize the F-theta objective with respect to thermal influences.

The radii r of the individual lenses L1-L6, and the thicknesses and distances d thereof are given in the following table:

| medium | r | radius | d | thickness |
|--------|-----|----------|-----|-----------|
| air    |     | **       | d1  | 53.49     |
| L1     | r1  | −55.493  | d2  | 5.30      |
|        | r2  | 429.101  |     |           |
| air    |     |          | d3  | 10.00     |
| L2     | r3  | −81.262  | d4  | 20.00     |
|        | r4  | −63.383  |     |           |
| air    |     |          | d5  | 0.50      |
| L3     | r5  | 279.297  | d6  | 25.00     |
|        | r6  | −171.994 |     |           |
| air    |     |          | d7  | 0.50      |
| L4     | r7  | −1373.769| d8  | 25.00     |
|        | r8  | −113.823 |     |           |
| air    |     |          | d9  | 0.50      |
| L5     | r9  | 129.543  | d10 | 30.00     |
|        | r10 | −383.533 |     |           |
| air    |     |          | d11 | 7.00      |
| L6     | r11 | −167.614 | d12 | 10.00     |
|        | r12 | 443.137  |     |           |
| air    |     |          | d13 | 10.00     |
| SG     | r13 | **       | d14 | 3.00      |
|        | r14 | **       |     |           |
| air    |     |          | d15 | 165.16    |

The distances and thicknesses are both designated d and are numbered according to their sequence along the optical axis A of the F-theta objective in the beam passage direction and indicated as d1-d15 in FIG. 1.

The terms "front" and "back" surfaces refer to the beam passage direction. The radii r1-r14 can be associated clearly with reference to the relevant lenses L1-L6 and the protective glass SG and are therefore not indicated in FIG. 1 for the sake of clarity.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A broadband color-corrected and thermally stable objective comprising:
   six individual lenses comprising in order:
      a first individual lens L1 as a biconcave lens;
      a second individual lens L2 as a meniscus;
      a third individual lens L3 as a biconvex lens;
      a fourth individual lens L4 as a plano-convex lens;
      a fifth individual lens L5 as a biconvex lens; and
      a sixth individual lens L6 as a biconcave lens,
   wherein for the six individual lenses at least two different materials are used, which for the wavelength range of 1065-1075 nm have a very low absorption of heat and have refractive indices which change in this wavelength range, dependent on the temperature, in opposite directions in that while the refractive index of one material for a constant wavelength increases with increasing temperature, the refractive index of the other material for the same wavelength decreases with increasing temperature and wherein the objective is so constructed as to function as an F-theta objective.

2. The objective as claimed in claim 1, wherein the material for the first and sixth individual lenses L1, L6 is quartz glass and the material for the second to fifth individual lenses L2-L5 is calcium fluoride.

3. The objective as claimed in claim 2, wherein the individual lenses L1-L6 and their arrangement along an optical axis satisfy the following requirements:

| medium | r | radius | d | thickness |
|---|---|---|---|---|
| air |  | ** | d1 | 53.49 |
| L1 | r1 | −55.493 | d2 | 5.30 |
|  | r2 | 429.101 |  |  |
| air |  |  | d3 | 10.00 |
| L2 | r3 | −81.262 | d4 | 20.00 |
|  | r4 | −63.383 |  |  |
| air |  |  | d5 | 0.50 |
| L3 | r5 | 279.297 | d6 | 25.00 |
|  | r6 | −171.994 |  |  |
| air |  |  | d7 | 0.50 |
| L4 | r7 | −1373.769 | d8 | 25.00 |
|  | r8 | −113.823 |  |  |
| air |  |  | d9 | 0.50 |
| L5 | r9 | 129.543 | d10 | 30.00 |
|  | r10 | −383.533 |  |  |
| air |  |  | d11 | 7.00 |
| L6 | r11 | −167.614 | d12 | 10.00 |
|  | r12 | 443.137 |  |  |
| air |  |  | d13 | 10.00 |
| SG | r13 | ** | d14 | 3.00 |
|  | r14 | ** |  |  |
| air |  |  | d15 | 165.16 | wherein r, the radii of the optically active surfaces of the lenses L1-L6 and of a downstream protective glass SG, and d, the thicknesses and distances of the lenses L1-L6 and of the protective glass SG, and also of an entrance pupil EP arranged upstream of the first lens L1 and of an image-field plane BE arranged downstream of the protective glass SG, are numbered along the optical axis A in the beam passage direction.

* * * * *